(12) United States Patent
Takase et al.

(10) Patent No.: US 6,432,374 B1
(45) Date of Patent: Aug. 13, 2002

(54) SOLID CHLORIDE ABSORBENT

(75) Inventors: Tsuneyoshi Takase; Nobuyashi Hayashi; Yasushi Shioya, all of Tokyo; Kaoru Fujiwara; Mitsuhiro Ohashi, both of Kurashiki, all of (JP)

(73) Assignees: Süd-Chemie Catalysts Japan, Inc.; Japan Energy Corporation, both of Tokyo (JP)

(*) Notice: Subject to any disclaimer, the term of this patent is extended or adjusted under 35 U.S.C. 154(b) by 0 days.

(21) Appl. No.: 09/994,684

(22) Filed: Nov. 28, 2001

Related U.S. Application Data

(62) Division of application No. 09/269,105, filed as application No. PCT/JP98/03281 on Jul. 22, 1998, now abandoned.

(30) Foreign Application Priority Data

Jul. 22, 1997 (JP) .............................. 9-195719

(51) Int. Cl.$^7$ .............................. C01B 7/07; C09K 3/00
(52) U.S. Cl. .............................. 423/240 S; 423/240 R; 423/213.2; 423/481; 252/190; 210/683
(58) Field of Search .............................. 252/189, 190; 502/405, 406, 409, 412, 415, 407, 238, 342; 423/213.2, 230, 240 R, 240 S, 241, 481; 210/683

(56) References Cited

U.S. PATENT DOCUMENTS

| | | | | |
|---|---|---|---|---|
| 3,935,295 A | * | 1/1976 | La Hue et al. ............. | 208/106 |
| 4,088,736 A | * | 5/1978 | Courty et al. ............... | 423/230 |
| 4,542,116 A | * | 9/1985 | Bertolacini et al. ........... | 502/65 |
| 4,664,910 A | * | 5/1987 | Caserio et al. ................ | 424/70 |
| 5,143,706 A | * | 9/1992 | Schubert ..................... | 423/230 |
| 5,254,516 A | * | 10/1993 | Gupta et al. .................. | 502/84 |
| 5,378,444 A | * | 1/1995 | Akita et al. ............... | 423/240 S |
| 5,439,867 A | * | 8/1995 | Khare et al. ................ | 502/407 |
| 5,494,880 A | * | 2/1996 | Siriwardane ................ | 502/400 |
| 5,597,540 A | * | 1/1997 | Akita et al. ................. | 423/241 |
| 5,703,003 A | * | 12/1997 | Siriwardane ................ | 502/400 |
| 5,780,001 A | * | 7/1998 | Khare et al. ................. | 423/230 |
| 5,866,503 A | * | 2/1999 | Siriwardane ................ | 502/439 |
| 5,972,835 A | * | 10/1999 | Gupta ........................ | 502/439 |
| 6,200,544 B1 | * | 3/2001 | Blachman ............... | 423/240 R |

FOREIGN PATENT DOCUMENTS

| | | | | |
|---|---|---|---|---|
| EP | 0 553 796 A1 | * | 8/1993 | .......... B01J/20/06 |
| GB | 2 287 714 A | * | 9/1995 | .......... B01D/53/34 |
| JP | 50-1085 | * | 1/1975 | |
| JP | 51-89890 | * | 8/1976 | .......... B01D/53/16 |
| JP | B-52-35036 | * | 9/1977 | .......... B01D/53/02 |
| JP | 52-52041 | * | 2/1990 | .......... B01J/20/10 |
| JP | 5-237324 | * | 9/1993 | .......... B01D/53/02 |
| JP | A-7-88315 | * | 4/1995 | .......... B01D/53/02 |
| JP | A-7-506048 | * | 7/1995 | .......... B01J/20/08 |

OTHER PUBLICATIONS

International Search Report (Aug. 18, 1998).*
Patent Abstracts of Japan, JP–A–7–88315, Apr. 4, 1995.*

* cited by examiner

*Primary Examiner*—Joseph D. Anthony
(74) *Attorney, Agent, or Firm*—Sughrue Mion, PLLC

(57) ABSTRACT

The invention has an object to provide a solid chloride absorbent which can efficiently absorb inorganic chlorides such as hydrogen chloride flowing out from a process in which a heavy naphtha and the like are treated and inorganic chloride derived from crude oil, and which is difficult to powder and soften after absorbing the chlorides. The solid chloride absorbent according to the invention comprises zinc oxide, a porous refractory inorganic matter and an inert binder, has a long life, and hardly releases the absorbed chlorides.

18 Claims, No Drawings

SOLID CHLORIDE ABSORBENT

This is a divisional of Application Ser. No. 09/269,105, filed Mar. 19, 1999 now abandoned, which is a national stage application of PCT Application No. PCT/JP98/03281, filed Jul. 22, 1998; the above noted prior applications are all hereby incorporated by reference; the international application to which benefit is claimed was not published under PCT Article 21(2) in English.

TECHNICAL FIELD

This invention relates to a technique of removing chloride from fluids in various industries, particularly to an absorbent for effectively removing chlorides from a flow of hydrocarbon such as a catalytically reformed gasoline, a catalytically reformed gas or the like.

BACKGROUND ART

The chloride contained in petroleum base hydrocarbon is derived from a crude oil or through a catalytic reaction. Further, it is known that the chloride exists in the form of an inorganic chloride or an organic chloride. The inorganic or organic chlorides derived from the crude oil are contained in a straight-run naphtha or the like, and come out in succeeding stages. Such a chloride causes a problem such as corrosion of apparatuses in a downstream or the like.

On the other hand, a catalytic reforming catalyst for manufacturing a gasoline base material from a heavy naphtha is activated by means of the organic chloride. Therefore, if such a catalyst is used, a hydrogen chloride is produced by the decomposition of the organic chloride in a reaction process and released, and then discharged with a product from a reactor. Particularly when a deteriorated catalyst is regenerated by means of chloride, considerably high concentrations of the hydrogen chloride and the organic chloride are discharged outside of the reactor. And also, in a moving bed type catalytic reforming process separately having a reaction step and a regenerating step, a catalyst regenerated by an oxichlorination brings chlorine into the reaction step, so that the hydrogen chloride and the organic chloride are generated in the reactor and then discharged with a product outside of the reactor.

Among such chlorides, the hydrogen chloride is generally removed by means of an alkaline absorbent or an alkaline cleaning agent. As an example of solid absorbent in JP-B-52-35036 is described an absorbent obtained by adding a clay mineral as an inert binder to zinc oxide and calcium oxide as an absorbing ingredient. JP-A-7-506048 teaches a method of absorbing chloride in hydrocarbon by means of an active alumina carrying an alkaline metal thereon. Further, in order to prevent corrosion of the apparatus, in JP-A-7-88315 is described an example in which an absorbent layer is placed just after a catalyst layer. The absorbent in the example is made by carrying an oxide such as calcium oxide, sodium oxide or the like, as not readily releasing an absorbed hydrogen chloride, on a refractory oxide such as zeorite or the like.

Such an absorbent can effectively absorb the inorganic chloride just after being charged, but many absorbents are apt to lack an absorbing capacity during use in an industrial scale. Particularly, the absorbent containing an active alumina as a main ingredient thereof fastly absorbs and effectively operates at an early time on charging, but is small in an absorbing capacity. Further, in case of changing operation conditions, it has a problem of releasing the absorbed inorganic chloride such as hydrogen chloride or the like. Further, the organic chloride leaks therefrom from a considerably early time and there is a case that a concentration of the organic chloride becomes higher than that in the petroleum raw material, which is not well known to a person in the art. It is Considered that in a case of absorbing the chlorides by a physical absorption in a multiple component system, the organic chloride being weak in an absorbing power is purged by hydrochloric acid being strong in the absorbing power. A treating method by using an absorbent having the active alumina carrying the alkaline metal thereon or the like as a main ingredient can improve the absorbing capacity, but can not solve the problem of releasing the absorbed chloride.

On the other hand, the absorbent having zinc oxide and calcium oxide as described in JP-B-52-35036 is slightly inferior to the active alumina in an absorbing rate, but it is superior in that it has a high theoretical absorbing capacity and does not readily release the absorbed hydrogen chloride or the like due to absorption by chemical bond. However, in an actual device, the absorbent may come to be exchanged when only several percentage of the theoretical absorbing amount is reached. This is because calcium chloride or the like produced by reacting with the chloride in the fluid to be treated is deliquesced with a trace of moisture contained in the hydrocarbon or the like, to extremely promote deterioration of strength of the absorbent, so that the absorbent becomes powdery or soft during use. Therefore, a pressure loss thereon increases due to compacting of the absorbent itself and clogging of a subsequent strainer, catalyst layer or the like. Particularly, the absorbent becomes extremely powdery or soft when it is used at about normal temperature or under a condition of a relatively high content of the moisture.

DISCLOSURE OF INVENTION

It is, therefore, an object of the invention to provide an absorbent having the aforementioned zinc oxide as a main ingredient without extremely deteriorating its strength due to deliquescence with moisture in a crude petroleum, or causing the absorbent itself to be compacted or a subsequent strainer, a catalyst layer or the like to be clogged due to powdering or softening. When the object is attained, the absorbent can absorb chlorides in a crude petroleum over a long time and never releases them, so that troubles caused by corrosion by chloride can be largely decreased.

In order to solve the above object, the inventors experimentally made and studied zinc oxide base absorbents having various compositions. As a result, it is found that calcium oxide as alkaline ingredient does not function effectively, though it is so far considered to be essential in order to effectively absorb chlorides. As a result of a further study, it is found that even when compounded with a porous refractory inorganic material instead of a calcium oxide ingredient, an absorbing property for chloride per unit weight does not decrease and fracture of the absorbent and reduction in its strength hardly occur due to moisture in the crude petroleum, and the invention is accomplished.

That is, the above object can be attained by using an absorbent comprising 2–15 parts by weight of an inert binder and 5–25 parts by weight of a porous refractory inorganic carrier, based on 10 parts by weight of zinc oxide. As the absorbent contains the porous refractory inorganic material, it has pores of a macro size with a pore volume of 0.35–0.65 $cm^3/g$ of as measured by means of a mercury press-in method.

A solid chloride absorbent according to the invention is adopted to remove chlorides such as hydrogen chloride generated in a petroleum fraction treating processes using a catalyst activated by chloride or the like and to remove chlorides derived from crude oil. In the above processes using the activated catalyst are included a catalytic reforming process for naphtha fraction, a catalyst regenerating process such as oxichlorination in a moving bed type catalytic reforming process, a pretreatment process such as catalyst drying, hydrogen reduction or the like, a reaction process such as aromatization, and the like. As a petroleum fraction, heavy naphtha, light naphtha and the like may be mentioned. As a catalyst activated by means of chloride, mention may be made of a catalyst for manufacturing gasoline base material by catalytically reforming the above heavy naphtha, a catalyst for manufacturing benzene from the light naphtha, a catalyst for manufacturing BTX from the heavy naphtha and the like. As a concrete example of such a catalyst, mention may be made of ordinary catalytic reforming catalyst, a catalyst having noble metals in the 8th to 10th columns on a periodic table carried by various kind of zeolite, and the like.

The absorbent according to the invention comprises zinc oxide, the inert binder and the porous refractory inorganic material. The porous refractory inorganic material necessarily has many pores of a macro size in its structure, for example, kieselguhr, porous silica, porous alumina, ceramic particles or the like may be mentioned. Such a additive is compounded in 5–25 parts by weight, preferably 10–17 parts by weight based on 10 parts by weight of zinc compound as oxide thereof in the absorbent. When it exceeds 25 parts by weight, a content of zinc oxide as a chloride absorbing ingredient is lowered, so that an amount of the chloride absorbed is unfavorably decreased. On the other hand, when it is less than 5 parts by weight, zinc oxide inside of the absorbent can not be used effectively, so that an amount of the chloride absorbed is unpreferably decreased.

There is no particular limitation with respect to zinc oxide, but from a viewpoint of chloride absorbing property zinc oxide preferably has a specific surface area of 20–100 $m^2/g$, preferably 30–80 $m^2/g$, more preferably 40–70 $m^2/g$ in use. Such a zinc oxide can be obtained by calcining zinc hydroxide, zinc carbonate, basic zinc carbonate or the like at a temperature of 350–400° C. They are preferably crystallized from its aqueous solution. For example, zinc carbonate precipitated from an aqueous solution of ammonium zinc carbonate, zinc hydroxide obtained by a homogeneous precipitation method and the like are preferably used.

To the above main ingredient of the absorbent is compounded an inert binder. As the binder, use may be made of clay, silica sol, water glass, alumina sol, aluminum hydroxide, boehmite type hydrous alumina or the like, which is generally commercial. Any kind of clay may be used if it has such a plasticity that commonly available ones possess. For example, mention may be made of kaoline, gairome clay, kibushi clay, bentonite or the like. Among them, kaoline and bentonite being readily available are preferably used. They are preferably used in the form of dry powder, but also, can be used in the form of clay containing water when mixed and kneaded in wet condition.

The inert binder is compounded in 2–15 parts by weight, preferably 5–10 parts by weight, based on 10 parts by weight of zinc compound as oxide thereof in the absorbent. When it exceeds 15 parts by weight, the amount of zinc oxide as a chloride absorbing component becomes small, so that an amount of chlorides absorbed is unfavorably decreased. The inert binder necessarily exists in the absorbent for maintaining strength of the absorbent. Therefore, when it becomes a small amount of less than 2 parts by weight, the strength unfavorably decreases.

The absorbent according to the invention can be made by mixing and shaping zinc oxide, the inert binder and the porous refractory inorganic material by means of a known usual method. Various shapes and sizes for the absorbent are adopted in accordance with the form of use, in general, cylindrical pellet with a diameter of about 1–6 mm and a length of about 3–20 mm is preferably used. But, there is no particular limitation, so pellets, tablets, granules, pulverized particles, spray-dried fine particles or the like, having different sizes and shapes may be used.

In a general method of manufacturing an extruded cylindrical pellet, given amounts of the zinc oxide powder, the porous refractory inorganic material such as kieselguhr powder or the like and the inert binder powder such as clay or the like are sufficiently dry-mixed by means of a mixing and kneading apparatus such as a kneader, a muller or the like, and then added with 0.2–0.5 parts by weight of, preferably 0.3–0.4 parts by weight of water, based on 1 part by weight of the above mixed powder and mixed. In adding the water, it is preferable to add stepwise for preventing an ununiform kneaded mass. The obtained kneaded mass is shaped to cylindrical pellets by means of an extruder or a pelletizer equipped with a die having a given shape. The pellets are dried at a temperature of 200–500° C., preferably 250–400° C., and then if necessary, cut to a desired length. The obtained dried material is sieved and used in an absorbing treatment.

The absorbent according to the invention can be manufactured only by wet-kneading without a dry-mixing process. In this case, as clay or the like is difficult to disperse, it is necessary to sufficiently disperse prior to adding for kneading. Therefore, it is effective to sufficiently disperse it in a large amount of water. If dispersion is insufficient, an uniform mixture can not be obtained and strength against compressive fracture decreases.

The thus obtained absorbent has a pore volume of 0.35–0.65 $cm^3/g$ as measured by the mercury press-in method. From a viewpoint of a chloride absorbing property, the pore volume is preferably 0.40–0.60 $cm^3/g$, more preferably 0.42–0.60 $cm^3/g$. When it is less than 0.35 $cm^3/g$, zinc oxide becomes low in the utilization efficiency at the same time, the absorbent is liable to powder or soften. On the other hand, when it exceeds 0.65 $cm^3/g$, the absorbent becomes extremely low in a packing density and short in a life.

The absorbent according to the invention can absorb chloride at a relatively high temperature, and even at around room temperature if the chloride is a gaseous hydrogen chloride or the like. Therefore, it can be preferably used over a wide temperature range from room temperature to 400° C., and usually 10–140° C., particularly 10–130° C. Further, it is effective for chlorides contained in liquid hydrocarbons at a temperature of 50–400° C., preferably 70–250° C., more preferably 100–200° C. The absorbent according to the invention chemically absorbs chlorides such as hydrogen chloride and the like and fixes them as a stable compound thereon, so that the absorbed chlorides are difficult to be released.

BEST MODE FOR CARRYING OUT THE INVENTION

The invention will be described on the preferred embodiments with reference to Examples and Comparative Example.

EXAMPLE 1

6.7 kg of clay powder, 10 kg of zinc oxide powder and 16.7 kg of kieselguhr powder are dry-mixed by means of a kneader for 10 minutes. After dry-mixing, 10 kg of water is gradually added in the kneader over 10 minutes and then kneading is conducted for another 10 minutes. The thus obtained kneaded mass is extruded to form pellets with a size of 3/16 inch. prior to being dried at 270° C. for 1 hour. After drying, the absorption test is conducted for chlorides contained in gaseous hydrocarbons (catalytically reformed gases of heavy naphtha) and the results are shown in Table 1.

EXAMPLE 2

A test is conducted in the same manner as in Example 1 except that clay powder is 5 kg, zinc oxide powder 10 kg and kieselguhr powder 10 kg. The results are shown in Table 1.

COMPARATIVE EXAMPLE 1

An absorption test for chlorides is conducted by making pellets in the same manner as in Example 1 except that clay powder is 4 kg, zinc oxide powder 10 kg and calcium hydroxide 8 kg as calcium oxide. The results are shown in Table 1.

Absorptivity Test with Respect to Gaseous Hydrocarbon

An absorbent with a pellet size of 3/16 inch. is charged in an absorption tower with a volume of 1 m$^3$. This is subjected to a continuous test in the condition of GHSV of 2300 h$_{-1}$, a temperature of 30° C. and a pressure of $3.4 \times 10^6$ Pa. The measurement is conducted every five days, and measuring items are a differential pressure between an inlet of the absorption tower and an outlet of a strainer following an outlet of the absorption tower, and an absorbing capacity for inorganic or organic chlorides.

The absorbing capacity for the inorganic chlorides is obtained as a removing rate calculated from a chloride ion concentration difference between before and after an absorbing treatment by respectively making an alkali solution (an aqueous solution of sodium carbonate and sodium hydrogencarbonate) absorb the gas before or after the absorbing treatment to measure the chloride ion concentration therein by an ion chromatography.

The absorbing capacity for the organic chloride is obtained as a removing rate calculated in the same manner as the above by respectively making an organic solvent absorb the gas before or after the absorbing treatment to measure a chloride concentration therein by a combustion method.

The tested gas is a catalytic reforming gas of a heavy naphtha, during the test period an average inorganic chloride concentration is 6 ppm as chloline, an average organic chlorine concentration 1 ppm as chloline and moisture concentration 100 ppm.

Measurement of Pore Volume

A pore volume is measured by means of an Auto-pore III 9420 made by Shimazu Corp. A measurable range of a radius of a pore is about 25–70000 angstrom with a slight difference depending on a measuring condition.

TABLE 1

| | Kieselguhr (part by weight) | Clay (part by weight) | Other component (part by weight) | Pore volume (cm$^3$/g) | Period before differential pressure of more than $1.0 \times 10^4$ Pa (day) | Period before chloride removing rate of less than 90% (day) |
|---|---|---|---|---|---|---|
| Example 1 | 16.7 | 6.7 | | 0.47 | 140 or more | 140 |
| Example 2 | 10.0 | 5.0 | | 0.42 | 140 or more | 140 |
| Comparative Example 1 | | 4.0 | 8.0 (CaO) | 0.31 | 50 | (180) |

Note)
10 parts by weight of zinc oxide is compounded.

In the absorbent according to the invention, an increase of a differential pressure is not observed during a period until a chloride removing rate becomes lower than 90%. This shows that fracture of the absorbent is extremely less. On the contrary, the conventional absorbent showed as Comparative Example 1 is relatively high in the packing density, namely 890 kg/m$^3$, in comparison with the packing density of the absorbent in Example 1, namely 720 kg/m$^3$, or that in Example 2, namely 730 kg/m$^3$, therefore, it has a large amount of zinc per unit volume, so that the period before less than 90% of chloride removing rate is long, but the absorbing power per weight of zinc oxide in the absorbent decreases by about 5–40%. Further, as an increase of a differential pressure is observed, it is considered that the absorbent begins to degrade from the start of absorbing treatment, and then the powdered absorbent leaks toward the succeeding stages.

The solid chloride absorbent according to the invention is applied to the removal of chloride which is generated in a process treating petroleum fraction by means of a catalyst activated by chlorides or the like or which is derived from crude oil. The absorbent according to the invention has a high strength, and hardly decreases in the strength and powders due to moisture in crude petroleum. Therefore, the absorbent can be not only used for a long time up to a near theoretical value of absorbing capacity but also hardly to releases the absorbed chloride, so that it is high in the operating efficiency.

What is claimed is:

1. A method of absorbing chloride, comprising absorbing chloride from fluids with a solid chloride absorbent comprising zinc oxide, 2–15 parts by weight of an inert binder selected from the group consisting of clay, silica sol, water glass, alumina sol, aluminum hydroxide and boehmite hydrous alumina based on 10 parts by weight of zinc oxide, and 5–25 parts of weight of porous refractory inorganic carrier selected from the group consisting of keiselguhr, porous silica, porous alumina and ceramic particles based on 10 parts by weight of zinc oxide, wherein the solid chloride absorbent has a pore volume of 0.35–0.65 cm$^3$/g as measured by a mercury press-in method, and the porous refractory inorganic carrier has many pores of a macro size in its structure.

2. A method according to claim 1, wherein the clay is selected from the group consisting of kaoline, gairome clay, kibushi clay and bentonite.

3. A method according to claim 1, wherein the inert binder is selected from the group consisting of kaoline and bentonite, and the porous refractory inorganic carrier is keiselguhr.

4. A method according to claim 1, wherein the inert binder is present in an amount of 5–10 parts by weight based on 10 parts by weight of zinc oxide.

5. A method according to claim 1, wherein the porous refractory inorganic carrier is present in an amount of 10–17 parts by weight based on 10 parts by weight of zinc.

6. A method according to claim 1, wherein the absorbing is at a temperature of 10–140° C.

7. A method according to claim 1, wherein the solid chloride absorbent has a pore volume of 0.40–0.60 cm$^3$/g as measured by a mercury press-in method.

8. A method according to claim 1, wherein the zinc oxide has a specific surface area of 30–80 m$^2$/g.

9. A method according to claim 8, wherein the zinc oxide has a specific surface area of 40–70 m$^2$/g.

10. A method of absorbing chloride, comprising absorbing chloride from fluids with a solid chloride absorbent consisting of zinc oxide, 2–15 parts by weight of an inert binder selected from the group consisting of clay, silica sol, water glass, alumina sol, aluminum hydroxide and boehmite hydrous alumina based on 10 parts by weight of zinc oxide, and 5–25 parts of weight of porous refractory inorganic carrier selected from the group consisting of keiselguhr, porous silica, porous alumina and ceramic particles based on 10 parts by weight of zinc oxide, wherein the solid chloride absorbent has a pore volume of 0.35–0.65 cm$^3$/g as measured by a mercury press-in method, and the porous refractory inorganic carrier has many pores of a macro size in its structure.

11. A method according to claim 10, wherein the clay is selected from the group consisting of kaoline, gairome clay, kibushi clay and bentonite.

12. A method according to claim 10, wherein the inert binder is selected from the group consisting of kaoline and bentonite, and the porous refractory inorganic carrier is keiselguhr.

13. A method according to claim 10, wherein the inert binder is present in an amount of 5–10 parts by weight based on 10 parts by weight of zinc oxide.

14. A method according to claim 10, wherein the porous refractory inorganic carrier is present in an amount of 10–17 parts by weight based on 10 parts by weight of zinc oxide.

15. A method according to claim 10, wherein the absorbing is at a temperature of 10–140° C.

16. A method according to claim 10, wherein the solid chloride absorbent has a pore volume of 0.40–0.60 cm$^3$/g as measured by a mercury press-in method.

17. A method according to claim 10, wherein the zinc oxide has a specific surface area of 30–80 m$^2$/g.

18. A method according to claim 17, wherein the zinc oxide has a specific surface area of 40–70 m$^2$/g.

* * * * *